United States Patent [19]

Kapur

[11] 4,298,587

[45] Nov. 3, 1981

[54] SILICON PURIFICATION

[75] Inventor: Vijay K. Kapur, Northridge, Calif.

[73] Assignee: Atlantic Richfield Company, Los Angeles, Calif.

[21] Appl. No.: 201,660

[22] Filed: Oct. 28, 1980

[51] Int. Cl.³ .................... C01B 33/02; C25B 1/24
[52] U.S. Cl. ................................ 423/350; 204/61
[58] Field of Search ............... 204/60, 61; 423/349, 423/350

[56] References Cited

U.S. PATENT DOCUMENTS 3,192,138  6/1965  Enk et al. .............................. 204/61

Primary Examiner—Howard S. Williams
Attorney, Agent, or Firm—Roderick W. MacDonald

[57] ABSTRACT

A method for purifying silicon which employes an electrolytic step using a metal fluoride electrolysis to generate silicon fluoride followed by a chemical reaction step which produces elemental silicon in a highly pure form.

11 Claims, 1 Drawing Figure

STEP I
    ELECTROLYTIC REACTIONS
        $4MF \rightarrow 4M^+ + 4F^-$
    AT ANODE
        $4F^- \rightarrow 2F_2(GAS) + 4e^-$
    AT CATHODE
        $4M_e^+ + 4e^- \rightarrow 4M$
    CHEMICAL REACTIONS INSIDE CELL
    AT ANODE
        $Si + 2F_2(GAS) \rightarrow SiF_4(GAS)$
STEP II (OUTSIDE CELL)
    $SiF_4(GAS) + 4M \rightarrow Si + 4MF$
  (FROM ANODE) (FROM    (PURE)
               CATHODE)

U.S. Patent  Nov. 3, 1981  4,298,587
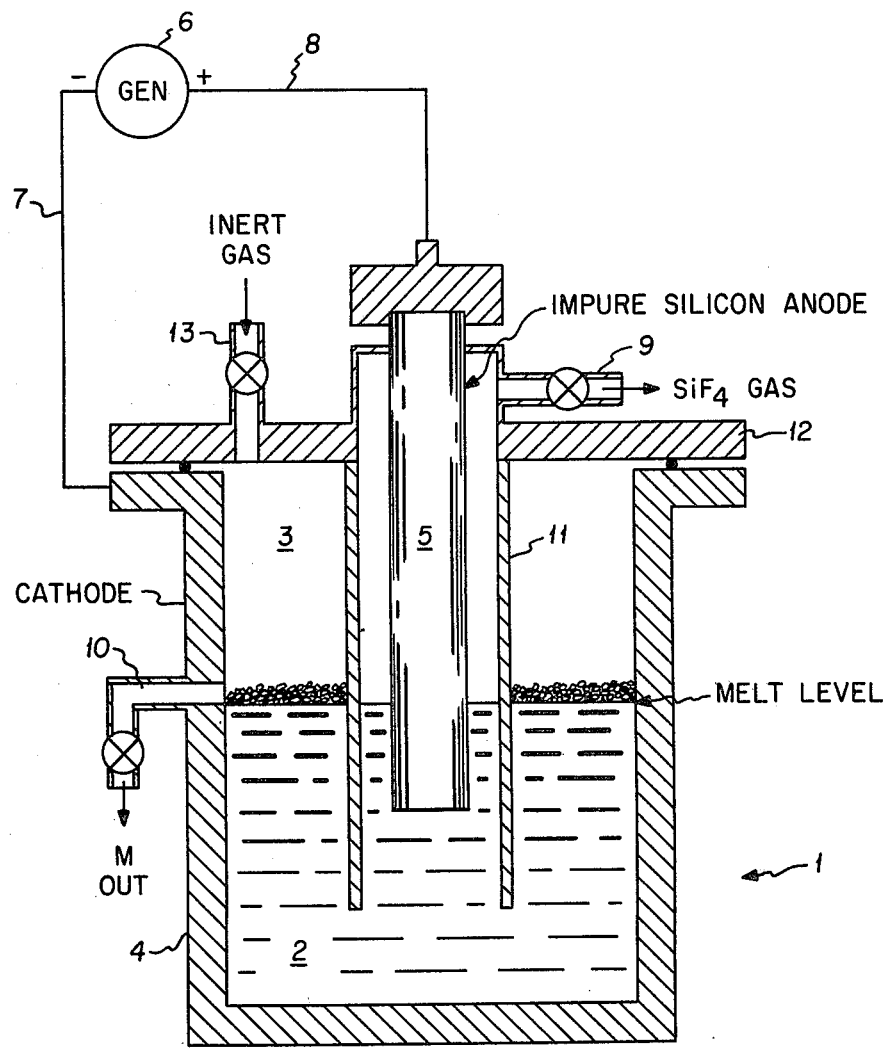
STEP I
  ELECTROLYTIC REACTIONS
    $4MF \longrightarrow 4M^+ + 4F^-$
  AT ANODE
    $4F^- \longrightarrow 2F_2(GAS) + 4e^-$
  AT CATHODE
    $4M_e^+ + 4e^- \longrightarrow 4M$
  CHEMICAL REACTIONS INSIDE CELL
  AT ANODE
    $Si + 2F_2(GAS) \longrightarrow SiF_4(GAS)$
STEP II (OUTSIDE CELL)
    $SiF_4(GAS) + 4M \longrightarrow Si + 4MF$
    (FROM ANODE) (FROM CATHODE) (PURE)

SILICON PURIFICATION

BACKGROUND OF THE INVENTION

Heretofore silicon of high purity has been produced for use in the electronic and other industries. The silicon produced, however, is expensive. With the recent growth of the photovoltaic branch of the solar industry, a demand has evolved for low cost, high purity silicon in quantities greater than that consumed by the semiconductor industry.

SUMMARY OF THE INVENTION

In accordance with this invention there is provided a method for purifying silicon to an extent that it will satisfy the demands of the photovoltaic solar industry.

The method of this invention employs an electrolytic step which utilizes the silicon which is to be purified as the anode and a fluoride of an alkali metal or alkaline earth metal as a fused salt electrolyte. The electrolysis produces alkali or alkaline earth metal at the cathode and fluorine gas at the anode. The fluorine gas produced at the anode reacts with the impure silicon anode to produce silicon tetrafluoride gas which is then reacted in a separate chemical reaction step with the metal to yield highly pure silicon metal.

Accordingly, it is an object of this invention to provide a new and improved process for purifying silicon. It is another object to provide a new and improved process for producing silicon of a purity sufficient for use as a solar photovoltaic material.

Other aspects, objectives and advantages of this invention will be apparent to those skilled in the art from this disclosure and the appended claims.

BRIEF DESCRIPTION OF THE DRAWINGS

The drawing shows a cross-section of an electrolytic cell employed in accordance with this invention, and chemical equations describing the electrolytic and the separate chemical reaction step of this invention.

DETAILED DESCRIPTION OF THE INVENTION

The drawing shows a closed electrolytic cell 1 which contains a molten electrolyte 2 therein under an inert gas atmosphere 3. Cell 1 contains a cathode 4 and an impure silicon anode 5 immersed in electrolyte 2. This cell has a conventional leak tight cover 12 and a valved inert gas inlet 13. Electrodes 4 and 5 are connected by means of electrical conduits 7 and 8 outside cell 1 in a conventional manner to an electrical source 6. Valved pipe means 9 is provided for recovering gaseous silicon tetrafluoride from inside the cell, and valved pipe means 10 is provided for obtaining liquid and/or gaseous metal from the region of cathode 4. An impervious ceramic separator 11 can be used to help prevent the gases formed at anode 5 from reacting inside cell 1 with the metal formed at cathode 4.

Anode 5 is composed of the impure silicon which is to be purified. The impure silicon initially employed can be any grade silicon desired, but is preferably metallurgical grade silicon or higher purity silicon and can include silicon alloys.

Cathode 4 can be any material which will conduct a current and will not react with electrolyte 2, e.g., conventional electrode materials such as graphite, nickel, and the like.

In this invention, anode 5 is the electrode where oxidation takes place, i.e., electrons are lost, and cathode 4 is the electrode where reduction takes place, i.e., electrons are gained.

Electrolyte 2 consists essentially of an alkali metal fluoride, an alkaline earth metal fluoride, or combinations of two or more of the alkali metal fluorides and/or alkaline earth metal fluorides, preferably sodium, potassium, lithium, beryllium, magnesium, calcium and barium, still more preferably sodium. For sake of clarity and brevity this invention will be described hereinafter as though a single metal fluoride such as sodium fluoride comprises electrolyte 2, but it should be understood that mixtures of two or more different fluorides can just as well be employed in the practice of this invention.

In the drawing, electrolyte 2 is described as MF which stands for a metal fluoride. The metal fluoride electrolyte disassociates into ions $M+$ and $F-$ in a conventional manner well known in the art. The fluoride ions will be attracted to anode 5, and when they reach anode 5 will lose an electron and thereby be converted to elemental fluorine. While at anode 5, elemental fluorine reacts with silicon in anode 5 to form gaseous silicon tetrafluoride which bubbles out of electrolyte 2 and is recovered from the cell by way of pipe 9. Impurities that are freed from the silicon when it combines with fluorine at anode 5 to form silicon tetrafluoride either dissolve in electrolyte 2 or precipitate to the bottom of cell 1 or both.

The metal ion $M+$ is attracted to cathode 4 and at cathode 4 gains an electron to thereby be converted into elemental metal. The metal, depending upon the particular operating conditions of cell 1, can be in a liquid and/or vaporous state, but whatever state it is in, is recovered by way of pipe 10 for other use as will be discussed in greater detail hereinafter.

Thus, it can be seen that the first step of the process of this invention yields silicon tetrafluoride gas as one product and elemental metal (M) as a separate product. Both of these products are useful in the second step of this invention or are useful separately outside the invention process depending on the particular desires of the operator.

For example, the second step of the process of this invention involves reacting a metal with the silicon tetrafluoride to form silicon metal in a very pure state, i.e., $99.99+\%$ silicon metal, and a metal fluoride. Metal recovered from cell 1 by way of pipe 10 can be employed in this chemical reaction to yield the pure silicon metal product of this process, or can be used separately outside this process for any of innumerable uses already known to those skilled in the art for alkali metals or alkaline earth metals.

The silicon tetrafluoride gas employed in the second step of this invention can, if desired, be purified to some extent before it is employed in the step II reaction. Such purification techniques are well known in the art, e.g., freezing under a vacuum, passing over heated iron filings, passing through molecular sieves, and the like, and, therefore, greater detail here is unnecessary to inform one skilled in the art. However, it should be understood that such purification of the silicon tetrafluoride gas can be employed in this invention, although it is not required by this invention.

It can be seen that a particular economic and processing advantage of this invention is that the metal formed at cathode 4 in cell 1 can be employed in the chemical reaction of step II of this invention, but it should be understood that this is not required for the practice of this invention.

The operating conditions of cell 1 and the chemical reaction of step II will both vary widely depending upon the specific materials employed, but once the inventive concept of this invention is known to those skilled in the art such operating conditions can readily be determined for any given set of materials and conditions. However, generally, electroylyte 2 will be heated to a temperature of from about 463° C. (essentially the melting point of a eutectic mixture of fluorides of lithium, sodium, and potassium) to about 1000° C. (essentially the melting point of sodium fluoride). Electrical means 6 will be adjusted so as to establish between cathode 4 and anode 5 a voltage differential of from about 6 to about 10 volts and a current density of from about 100 to about 500 milliamperes per square centimeter. The chemical reaction of step II will be carried out at a temperature of from about 1450 to about 1600° C. under ambient or elevated pressures, and under an inert atmosphere to maintain the high purity of the silicon product of this invention. It should be noted that the chemical reaction of step II of this invention is highly exothermic and therefore temperature control for this reaction may be highly desirable.

The pure silicon and metal fluoride products formed in step II of this invention will both be liquids, but are readily separable because the metal fluoride will normally float on top of the silicon so that physical separation of these two materials is easy and readily obvious to those skilled in the art.

EXAMPLE

An electrolytic reaction is carried out in a cell such as that shown in the drawing wherein sodium fluoride is employed for electrolyte 2. Cathode 4 is formed of nickel metal of conventional electrode purity and composition, and anode 5 is formed of metallurgical grade silicon. Argon is provided for inert atmosphere 3. Cell 1 is heated to a temperature of about 1000° C. with a voltage differential of 6 volts and current density of 150 milliamperes per square centimeter generated by a conventional D.C. electrical generator 6.

A mixture of argon and gaseous silicon tetrafluoride is recovered from cell 1 by way of pipe 9 and liquid sodium is recovered from cell 1 by way of pipe 10.

The recovered liquid sodium and silicon tetrafluoride gas are reacted together at 200° C. under an argon atmosphere and autogenous pressure so that four moles of sodium react with one mole of silicon tetrafluoride to yield one mole of 99.99+% purity silicon metal and four moles of liquid sodium fluoride compound. The sodium fluoride floats on top of the molten silicon metal and is easily decanted to yield a separate product of high purity silicon which is suitable for use in the semiconductor industry and industries that manufacture photovoltaic cells for solar use.

Reasonable variations and modifications are possible within the scope of this disclosure without departing from the spirit and scope of this invention.

The embodiments of the invention in which an exclusive property or privilege is claimed are defined as follows:

1. In a method for purifying silicon which contains impurities, the improvement comprising providing said impure silicon in electrode form, employing said electrode as the anode in a heated electrolytic cell, said elecytrolytic cell also containing a cathode, an inert atmosphere, and an electrolyte, said electrolyte consisting essentially of an alkali metal fluoride, an alkaline earth metal fluoride, or combinations of two or more thereof, said cell being operated at a temperature and an electrical current and voltage such that elemental fluorine is formed from said electrolyte at said anode and silicon is removed from said anode as vaporous $SiF_4$, and elemental metal is formed from said electrolyte at said cathode, collecting said $SiF_4$, separately reacting said collected $SiF_4$ with an alkali metal, alkaline earth metal, or combination of two or more of such metals to form the fluoride of said metal or metals and purified elemental silicon, and separating said purified silicon from said fluoride.

2. The method according to claim 1 wherein at least part of said metal which is reacted with said $SiF_4$ has been recovered from the cathode area of said electrolytic cell.

3. The method according to claim 1 wherein said electrolytic cell is heated to a temperature of from about 463° C. to about 1000° C. and has established between said anode and cathode a voltage of from about 6 to about 10 volts and current density of from about 100 to about 500 milliamperes per square centimeter.

4. The method according to claim 1 wherein said anode is composed of metallurgical grade silicon.

5. The method according to claim 1 wherein said electrolyte consists essentially of alkali metal fluoride.

6. The method according to claim 5 wherein said electrolytic cell is heated to a temperature of from about 463° C. to about 1000° C. and has established between said anode and cathode a voltage of from about 6 to about 10 volts and current density of from about 100 to about 500 millamperes per square centimeter.

7. The method according to claim 6 wherein said anode is composed of metallurgical grade silicon.

8. The method according to claim 1 wherein said electrolyte consists essentially of NaF.

9. The method according to claim 8 wherein said electrolytic cell is heated to a temperature of from about 463° C. to about 1000° C. and has established between said anode and cathode a voltage of from about 6 to about 10 volts and current density of from about 100 to about 500 millamperes per square centimeter.

10. The method according to claim 9 wherein said anode is composed of metallurgical grade silicon.

11. The method according to claim 10 wherein Na recovered at the cathode of the electrolytic step is used to react with the $SiF_4$ from the electrolytic step and thereby form the purified elemental silicon product of the process.

* * * * *